(12) United States Patent
Tan (10) Patent No.: US 10,642,060 B2
(45) Date of Patent: May 5, 2020

(54) HOLOGRAPHIC DISPLAY PANEL AND HOLOGRAPHIC DISPLAY DEVICE (71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 109 days.

(21) Appl. No.: 15/772,208

(22) PCT Filed: Nov. 10, 2017

(86) PCT No.: PCT/CN2017/110412
§ 371 (c)(1),
(2) Date: Apr. 30, 2018

(87) PCT Pub. No.: WO2018/046025
PCT Pub. Date: Mar. 15, 2018

(65) Prior Publication Data
US 2018/0321499 A1   Nov. 8, 2018

(30) Foreign Application Priority Data

Sep. 9, 2016   (CN) .......................... 2016 1 0815306
Mar. 20, 2017  (CN) .......................... 2017 1 0166323

(51) Int. Cl.
| G02B 30/26 | (2020.01) |
| G03H 1/08 | (2006.01) |
| G03H 1/22 | (2006.01) |
| G02B 30/00 | (2020.01) |
| G02B 26/06 | (2006.01) |
| G02B 26/08 | (2006.01) |
| G03H 1/02 | (2006.01) |
| G03H 1/26 | (2006.01) |

(52) U.S. Cl.
CPC ............. G02B 30/26 (2020.01); G02B 26/06 (2013.01); G02B 26/0808 (2013.01);
(Continued)

(58) Field of Classification Search
CPC .. G02B 27/225; G02B 26/0808; G02B 26/06; G02B 27/22; G02B 27/0172;
(Continued)

(56) References Cited

U.S. PATENT DOCUMENTS

2007/0188667 A1   8/2007   Schwerdtner
2010/0027083 A1   2/2010   Kroll et al.
(Continued)

FOREIGN PATENT DOCUMENTS

CN   1894976 A    1/2007
CN   101568888 A  10/2009
(Continued)

OTHER PUBLICATIONS

Second Office Action for Chinese Patent Application No. 201710166323.1 dated Apr. 1, 2019.
(Continued)

*Primary Examiner* — Jade R Chwasz
(74) *Attorney, Agent, or Firm* — Calfee, Halter & Griswold LLP (57) ABSTRACT

A holographic display panel, a holographic display device, and a holographic display method are disclosed. The holographic display panel includes a plurality of sub-pixels arranged in an array and a phase plate disposed on a light exit side of the plurality of sub-pixels; and a blocking member disposed between the plurality of sub-pixels and the phase plate; an orthogonal projection of the blocking member on a plane where the plurality of sub-pixels are located is arranged between adjacent sub-pixels for blocking an edge portion of a light beam diffracted by the sub-pixel.

17 Claims, 6 Drawing Sheets

(52) U.S. Cl.
CPC .............. *G02B 30/00* (2020.01); *G03H 1/02* (2013.01); *G03H 1/08* (2013.01); *G03H 1/0841* (2013.01); *G03H 1/2249* (2013.01); *G03H 1/2294* (2013.01); *G03H 2001/0224* (2013.01); *G03H 2001/2297* (2013.01); *G03H 2001/2655* (2013.01); *G03H 2210/454* (2013.01); *G03H 2223/12* (2013.01); *G03H 2223/13* (2013.01); *G03H 2225/55* (2013.01)

(58) Field of Classification Search
CPC ........ G02B 2027/0174; G02B 27/2228; G02B 2027/0105; G02B 30/26; G02B 30/00; G03H 1/2249; G03H 1/08; G03H 1/02; G03H 1/2294; G03H 1/0841; G03H 2225/55; G03H 2223/13; G03H 2223/12; G03H 2210/454; G03H 2001/2655; G03H 2001/2297; G03H 2001/0224; G03H 2223/23
USPC .......................................................... 359/11
See application file for complete search history.

(56) References Cited

U.S. PATENT DOCUMENTS

| | | |
|---|---|---|
| 2010/0253995 A1 | 10/2010 | Reichelt |
| 2010/0297538 A1 | 11/2010 | Chang et al. |
| 2012/0120059 A1 | 5/2012 | Bratkovski et al. |
| 2013/0300956 A1 | 11/2013 | Chen et al. |
| 2014/0300711 A1 | 10/2014 | Kroon et al. |
| 2016/0223860 A1 | 8/2016 | Wang et al. |
| 2016/0327906 A1 | 11/2016 | Futterer |
| 2016/0349702 A1* | 12/2016 | Sung ..................... G03H 1/02 |
| 2016/0373732 A1 | 12/2016 | Kim et al. |
| 2017/0017086 A1 | 1/2017 | Wei |

FOREIGN PATENT DOCUMENTS

| | | |
|---|---|---|
| CN | 202025132 U | 11/2011 |
| CN | 103918257 A | 7/2014 |
| CN | 104024349 A | 9/2014 |
| CN | 104111560 A | 10/2014 |
| CN | 104570370 A | 4/2015 |
| CN | 105917277 A | 8/2016 |
| CN | 106154797 A | 11/2016 |
| CN | 206002848 A | 3/2017 |
| CN | 106646905 A | 5/2017 |

OTHER PUBLICATIONS

First Office Action for Chinese Patent Application No. 201610815306.1 dated Apr. 16, 2018.

Search Report for International Application No. PCT/CN2017/110412 dated Jan. 3, 2018.

* cited by examiner

HOLOGRAPHIC DISPLAY PANEL AND HOLOGRAPHIC DISPLAY DEVICE

RELATED APPLICATIONS

The present application is the U.S. national phase entry of the international application PCT/CN2017/110412, with an international filing date of Nov. 10, 2017, which claims the benefit of Chinese Patent Application No. 201610815306.1, filed on Sep. 9, 2016, and Chinese Patent Application No. 201710166323.1, filed on Mar. 20, 2017, the entire disclosures of which are incorporated herein by reference.

TECHNICAL FIELD

The present disclosure relates to the field of display technology, and particularly to a holographic display panel and a holographic display device.

BACKGROUND

Stereoscopic display based on holographic information is getting more and more attention. In the recording of holographic information, two laser beams traveling along different paths (i.e., a reference beam and an object beam) interfere with each other to form an optical interference pattern. The optical interference pattern causes a chemical or physical change in the photosensitive recording medium so that information relating to the object to be reconstructed is recorded in the recording medium. In the reconstruction of the holographic information, a reference beam similar to the reference beam for recording is irradiated to the recording medium so that the optical interference pattern in the recording medium diffracts the reference beam to reconstruct the object beam, thereby reconstructing the holographic information. With the continuous development of display technologies, stereoscopic display technologies have become increasingly popular. Typically, dynamic display of a hologram image can be achieved by using e.g. a combination of a liquid crystal display panel and a phase plate. In realizing stereoscopic display, different views with a horizontal parallax are provided to the user's left and right eyes, respectively. Through the fusion of the brain, a stereoscopic image with depth perception is finally formed.

SUMMARY

The embodiments of the present disclosure provide a holographic display panel, a holographic display device and a holographic display method.

According to an aspect of the present disclosure, an embodiment of the present disclosure provides a holographic display panel. The holographic display panel includes: a plurality of sub-pixels arranged in an array and a phase plate disposed on a light exit side of the plurality of sub-pixels; and a blocking member disposed between the plurality of sub-pixels and the phase plate; an orthogonal projection of the blocking member on a plane where the plurality of sub-pixels are located is arranged between adjacent sub-pixels for blocking an edge portion of a light beam diffracted by the sub-pixel.

Optionally, a width a of the blocking member satisfies: $a=0.61\lambda d/w$, where $\lambda$ is a wavelength of the light beam, w is a width of the sub-pixel, and d is a distance between the blocking member and the sub-pixel.

Optionally, the holographic display panel further includes a first substrate disposed on the light exit side of the plurality of sub-pixels. The phase plate is disposed on a surface of the first substrate facing away from the plurality of sub-pixels, and the blocking member is disposed on a surface of the first substrate facing the plurality of sub-pixels.

Optionally, the holographic display panel further includes a color film substrate disposed on the light exit side of the plurality of sub-pixels, and the blocking member is disposed on a surface of the color film substrate facing away from the plurality of sub-pixels.

Optionally, the phase plate is configured to adjust an angle of a light beam from the plurality of sub-pixels, and/or the phase plate includes a plurality of sub-phase plates corresponding to the plurality of sub-pixels one-to-one.

Optionally, the phase plate is a diffraction grating.

Optionally, the holographic display panel further includes a plurality of depth display units; each depth display unit includes at least two adjacent pixels, and each pixel includes a plurality of sub-pixels; each depth display unit further includes a plurality of phase plates, each sub-pixel corresponds to a phase plate along a direction of light emitted from the sub-pixel, the phase plate is configured to control a diffraction angle of light emitted through the phase plate; wherein phase plates corresponding to sub-pixels of a same pixel have a same diffraction angle, diffraction angles of light beams emitted by different pixels in a same depth display unit after passing through the phase plate are different, so that reverse extension lines of the light beams emitted from the same depth display unit intersect at a depth position.

Optionally, the plurality of depth display units are divided into display groups arranged in an array, each display group is composed of at least two depth display units adjacent to each other; wherein depths of field of depth display units in a same display group are different.

Optionally, two adjacent depth display units have different depths of field.

According to another aspect of the present disclosure, an embodiment of the present disclosure provides a holographic display device. The holographic display device includes the holographic display panel as described in the above embodiments.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

When implementing a near-eye display or using a virtual reality display device, the virtual image or point in the space is determined by the angle of divergence or convergence of the incident light, and such a display device is generally required to have a high resolution (i.e., the number of sub-pixels per inch, PPI). However, the inventors have found that as the resolution increases, the size of the sub-pixels decreases and Fraunhofer diffraction will occur between the sub-pixels and the phase plate of the display panel. The presence of the Fraunhofer diffraction angle results in crosstalk between the light beams from adjacent sub-pixels, which greatly affects the depth of field and position of the stereoscopic image and reduces the display effect.

Figure 1A:
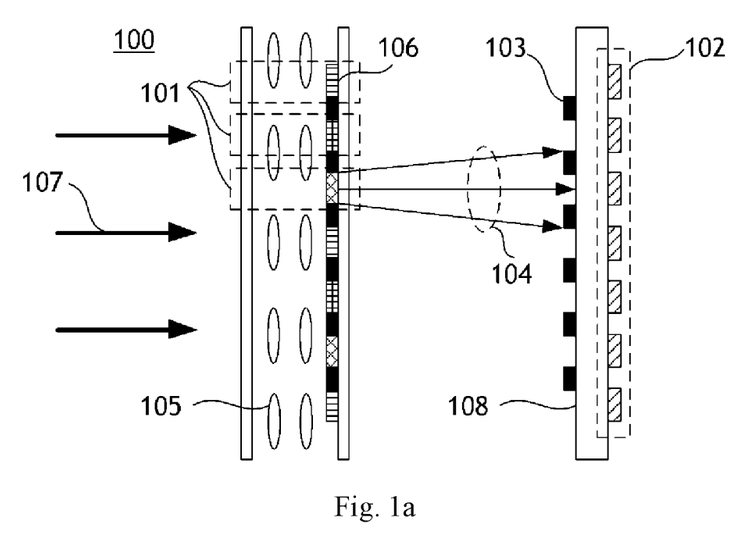
FIG. 1a and FIG. 1b are structural schematic diagrams of holographic display panels according to the embodiments of the present disclosure.
Figure 1B:
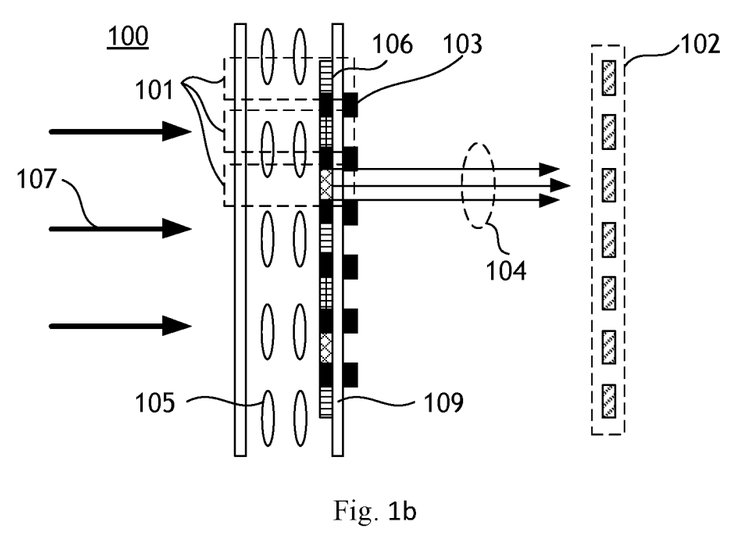

According to an aspect of the present disclosure, an embodiment of the present disclosure provides a holographic display panel. As shown in FIG. 1a and FIG. 1b, the holographic display panel 100 includes: a plurality of sub-pixels 101 arranged in an array and a phase plate 102 disposed on a light exit side of the plurality of sub-pixels 101; and a blocking member 103 disposed between the plurality of sub-pixels 101 and the phase plate 102; an orthogonal projection of the blocking member 103 on a plane where the plurality of sub-pixels 101 are located is arranged between adjacent sub-pixels 101 for blocking an edge portion of a light beam diffracted by the sub-pixel 101.

In the embodiment of the present disclosure, by using the blocking member, the problem of beam crosstalk caused by the Fraunhofer diffraction angle of small-size sub-pixels is well solved. Therefore, with the configuration of the embodiments of the present disclosure, clear sub-pixel edges can be obtained, color crosstalk and grayscale crosstalk can be eliminated, and an accurate depth of field of an image can also be provided, improving the visual effect of the holographic display.

As shown in FIG. 1a and FIG. 1b, the sub-pixel 101 can be a sub-pixel in a liquid crystal display panel, which controls the light intensity on each color filter 106 by means of the liquid crystal 105. The liquid crystal panel can further include a backlight module (not shown in FIG. 1a and FIG. 1b) for providing the backlight 107. Similarly, the sub-pixel 101 can also be a sub-pixel in an OLED display panel.

Figure 2:
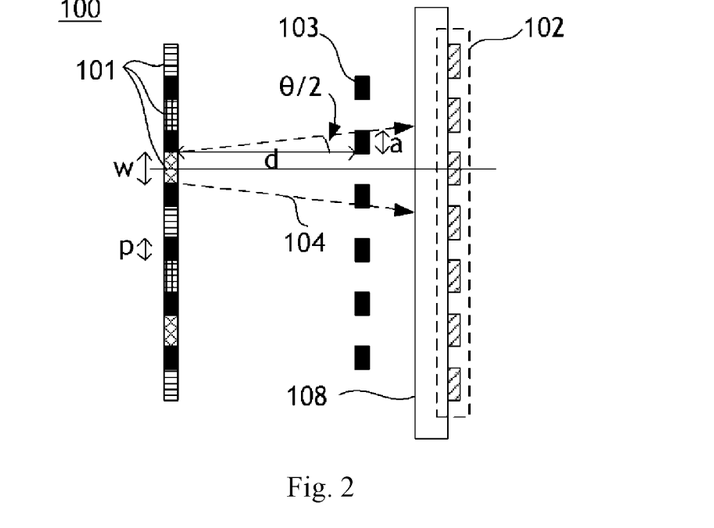
FIG. 2 is a structural schematic diagram of blocking members in a holographic display panel according to an embodiment of the present disclosure.

As shown in FIG. 2, optionally, a width a of the blocking member 103 satisfies: $a=0.61\lambda d/w$, where $\lambda$ is a wavelength of the light beam 104, w is a width of the sub-pixel 101, and d is a distance between the blocking member 103 and the sub-pixel 101.

Due to the reduction in the size of the sub-pixel, Fraunhofer diffraction is a major factor in limiting the display resolution. The width condition of the blocking member can be deduced from the Fraunhofer diffraction angle. With the above width condition, the blocking member can block the edge portion of the light beam diffracted by the sub-pixel, avoiding the edge portion from being incident on the portions of the phase plate corresponding to the adjacent sub-pixels.

For a given sub-pixel, the Fraunhofer diffraction angle $\theta=1.22\lambda/w$. For a smaller angle $\theta$, $\theta/2 \approx tg\theta/2 = a/d$. Thus, the width a of the blocking member 103 can be obtained as $a=0.61\lambda d/w$.

It can be seen from the above relationship that as the distance d increases, the width a of the blocking member 103 also increases accordingly. For a given width w of the sub-pixel, a large blocking member 103 may instead block the portion of the light beam 104 close to the optical axis, thereby losing light intensity. Therefore, the width a of the blocking member 103 (or, the distance d between the blocking member 103 and the sub-pixel 101) should be limited to an appropriate range. Assuming that the interval between two adjacent sub-pixels 101 is p, the width a of the blocking member 103 should be smaller than p. Therefore, $0.61\lambda d/w \leq p$, that is, the distance d between the blocking member 103 and the sub-pixel 101 is $d \leq wp/0.61\lambda$.

Optionally, as shown in FIG. 1a, the holographic display panel 100 further includes a first substrate 108 disposed on the light exit side of the plurality of sub-pixels 101. The phase plate 102 is disposed on a surface of the first substrate 108 facing away from the plurality of sub-pixels 101, and the blocking member 103 is disposed on a surface of the first substrate 108 facing the plurality of sub-pixels 101. However, as shown in FIG. 2, since $d \leq wp/0.61\lambda$, the blocking member 103 can also be disposed at a predetermined position between the sub-pixel 101 and the first substrate 108.

Optionally, as shown in FIG. 1b, the holographic display panel 100 further includes a color film substrate 109 disposed on the light exit side of the plurality of sub-pixels 101, and the blocking member is disposed on a surface of the color film substrate 109 facing away from the plurality of sub-pixels 101.

Figure 3A:
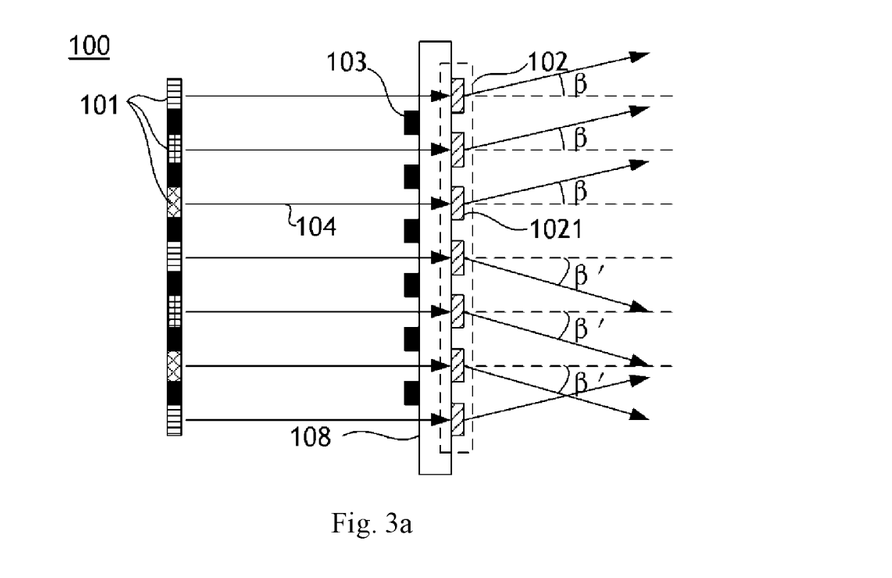
FIG. 3a is a schematic diagram of a phase plate adjusting a beam angle in a holographic display panel according to an embodiment of the present disclosure.

Optionally, as shown in FIG. 3a, the phase plate 102 is configured to adjust an angle of a light beam 104 from the plurality of sub-pixels 101. Optionally, the phase plate 102 includes a plurality of sub-phase plates 1021 corresponding to the plurality of sub-pixels 101 one-to-one.

In practical applications, the phase plate can be integrated or can be composed of a plurality of sub-phase plates arranged on a substrate (as shown in FIG. 3a). The integrated phase plate can include a plurality of effective regions respectively corresponding to the plurality of sub-pixels. The integrated phase plate can be directly disposed on the light exit side of the plurality of sub-pixels to control the light beams from the plurality of sub-pixels. In the context of the present disclosure, "the optical path between the sub-pixel and the phase plate" refers to the optical path between a single sub-pixel and the sub-phase plate/effective region corresponding to this sub-pixel.

Similarly, a phase plate composed of an integrated phase plate or a plurality of sub-phase plates can also be disposed on the surface of the first substrate facing away from the plurality of sub-pixels, and the blocking member is disposed on the surface of the first substrate facing the plurality of sub-pixels. In this case, the blocking member can be fabricated using e.g. a black matrix process in the liquid crystal display panel. Therefore, the blocking member can have a plurality of openings that are in one-to-one correspondence with the plurality of effective regions or the plurality of sub-phase plates.

Optionally, the phase plate 102 is a diffraction grating.

With diffraction gratings having different parameters, the light beams from the sub-pixels can be adjusted to desired directions. Thus, as shown in FIG. 3a, the phase plate 102 can control the diffraction angle β of the light emitted by the phase plate 102. The above-mentioned diffraction angle β is the angle between the propagation direction of the outgoing light of the phase plate 102 and the propagation direction of the incident light.

It should be noted that since the phase plate 102 is used to diffract the incident light, the phase plate 102 can be a phase grating, i.e., a diffraction grating. On this basis, in order to increase the utilization of light, a transmission grating can be selected as the phase plate 102 described above. In this case, since light has different phases in the convex and concave portions of the transmission grating, it is possible to cause diffraction for light passing through the transmission grating.

Figure 3B:
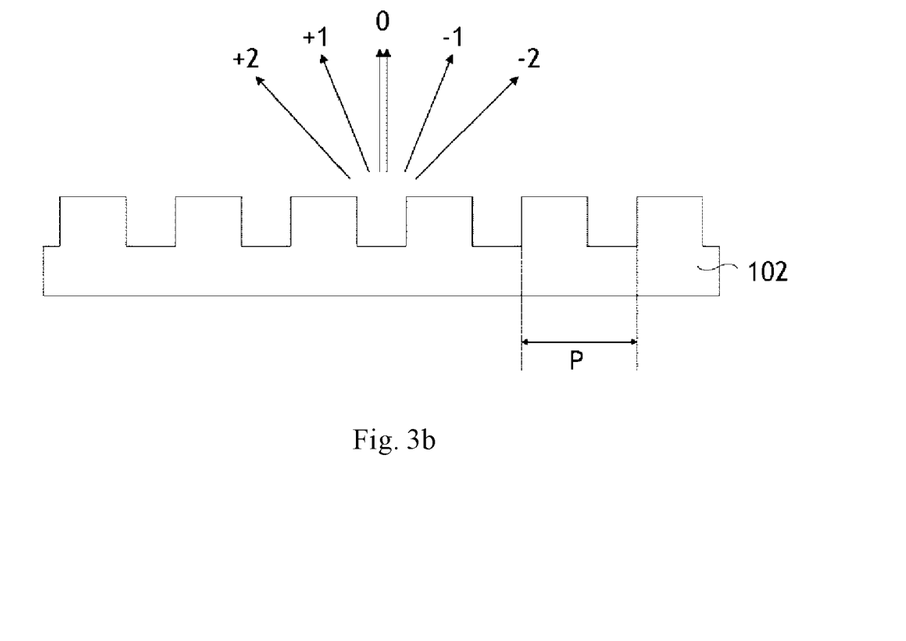
FIG. 3b is a structural schematic diagram of a phase plate in a holographic display panel according to an embodiment of the present disclosure.
Figure 3C:
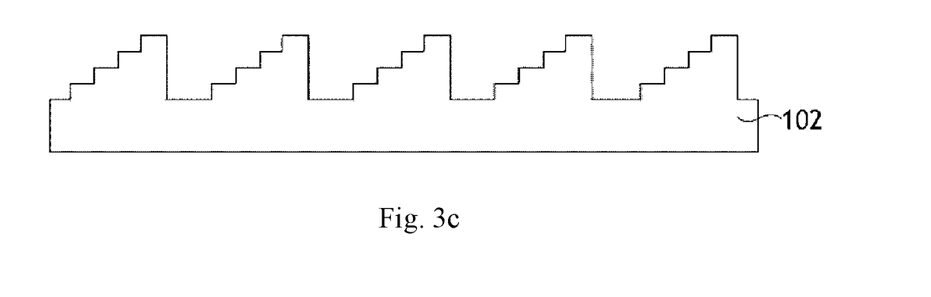
FIG. 3c is a structural schematic diagram of a phase plate in a holographic display panel according to another embodiment of the present disclosure.

Specifically, if the phase plate 102 is a transmission grating, the transmission grating can be a single-step grating as shown in FIG. 3b or a multi-step grating as shown in FIG. 3c. In this case, the diffraction angle β of the m-th order diffracted wave of the transmission grating is determined only by the grating period P, the wavelength λ of the incident light, and the incident angle $β_0$, i.e., $\sin β - \sin β_0 = mλ/P$ ($m=0, ±1, ±2, \ldots$). Therefore, when the wavelength λ of the incident light is the same, the diffraction angle β can be adjusted by adjusting the grating period P of the transmission grating.

Figure 4:
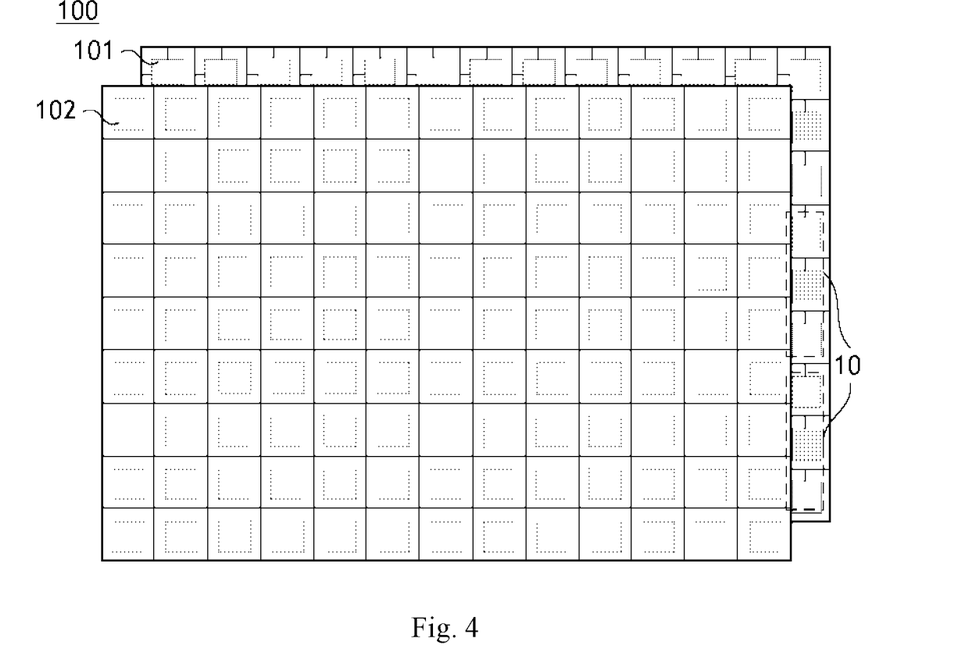
FIG. 4 is a schematic diagram of displaying depth of field according to an embodiment of the present disclosure.
Figure 5:
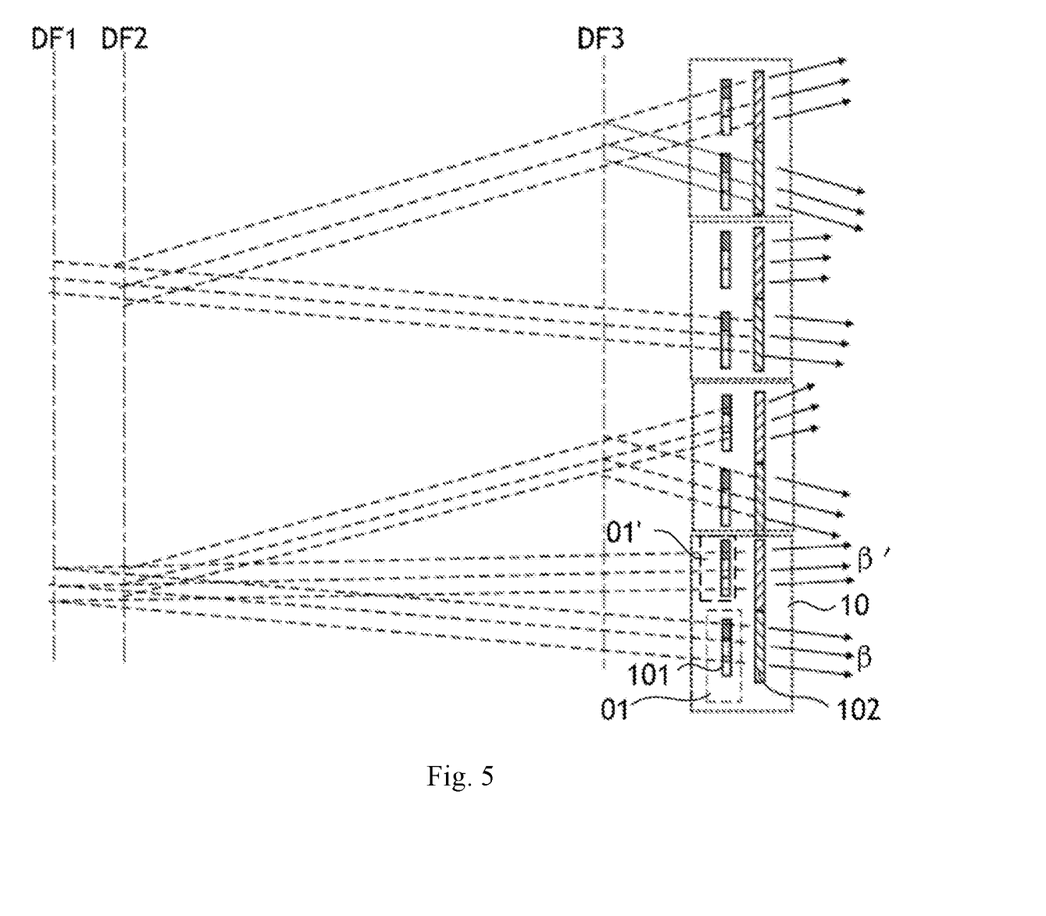
FIG. 5 is a schematic diagram of a holographic display according to an embodiment of the present disclosure.

Optionally, as shown in FIG. 4 and FIG. 5, the plurality of sub-pixels 101 are divided into a plurality of pixel groups 10 for displaying a plurality of images with different depths of field respectively.

The plurality of sub-pixels of the holographic display panel can be divided into a plurality of pixel groups, and each pixel group is configured for displaying an image with a specific depth of field. Thus, by applying e.g. time division multiplexing and persistence of vision, the holographic display panel can be used to display a plurality of images having different depths of field, thereby providing a picture having a plurality of depths of field.

Figure 7:
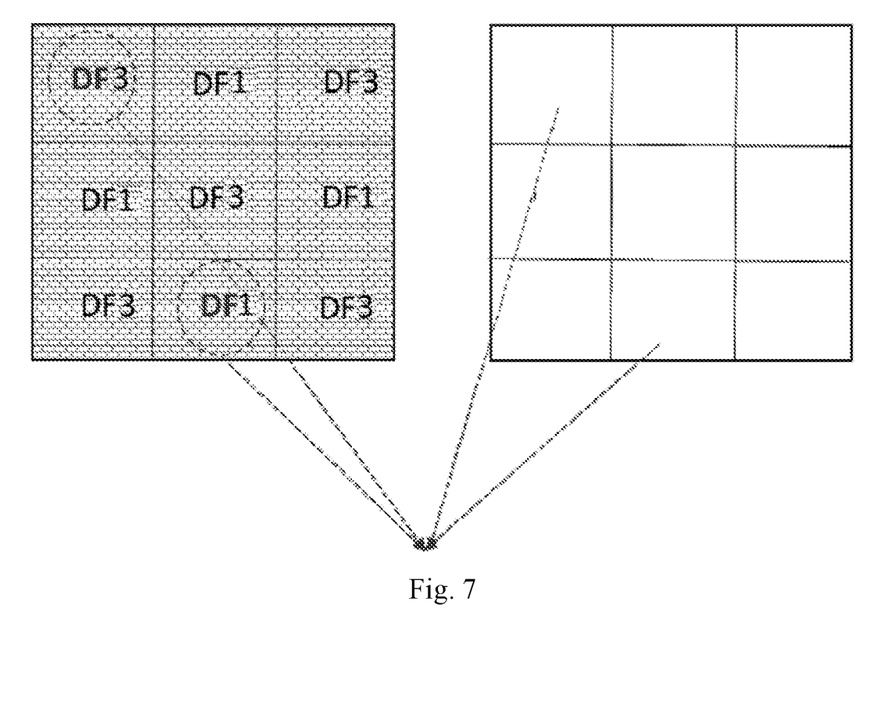
FIG. 7 is a schematic diagram of realizing depth of field according to an embodiment of the present disclosure.

Specifically, as shown in FIG. 3a, FIG. 5, and FIG. 7, three adjacent sub-pixels 101 of different colors can be regarded as three sub-pixels of the pixel 01, and diffraction angles β of the light beams emitted from the phase plate 102 corresponding to these sub-pixels are the same. Similarly, the diffraction angles β' of the light beams emitted by the phase plate 102 corresponding to three sub-pixels 101' of the pixel 01' are the same, and β≠β'. A number of pixels 01 and pixels 01' constitute the first pixel group 10. The reverse extension of the light beam from the pixel 01 and the reverse extension of the light beam from the pixel 01' intersect at the position of the first depth of field (DF1). As a result, the observer can observe the image at the position of the first depth of field (DF1). Although only one pixel group 10 is shown in FIG. 5, those skilled in the art can understand that the plurality of sub-pixels 101 can also be divided into a plurality of pixel groups 10 throughout the entire display area. During displaying the image of the depth of field DF1, the plurality of pixel groups 10 operate simultaneously, thereby obtaining an image that fills the display area and has a depth of field DF1. Similarly, the phase plate can be used to adjust the light beam from the pixel, different pixel groups can thus be obtained, so that the observer observes a plurality of images with different depths of field (DF1, DF2, and DF3).

FIG. 7 is a schematic diagram of realizing depth of field according to an embodiment of the present disclosure. The pixel arrangement is shown on the left, and the sub-phase plate corresponding to the pixels is shown on the right. As shown in FIG. 5 and FIG. 7, one pixel group corresponds to two pixels, each pixel corresponds to three sub-pixels, and the structures of the sub-phase plates respectively corresponding to two pixels in one pixel group are different. Two pixels in one pixel group form the depth of field DF3. The odd-numbered pixels corresponding to the odd-numbered pixel group and the even-numbered pixels corresponding to the even-numbered pixel group form the depth of field DF2.

Therefore, optionally, the holographic display panel further includes a plurality of depth display units; each depth display unit includes at least two adjacent pixels, and each pixel includes a plurality of sub-pixels; each depth display unit further includes a plurality of phase plates, each sub-pixel corresponds to a phase plate along a direction of light emitted from the sub-pixel, the phase plate is configured to control a diffraction angle of light emitted through the phase plate; wherein phase plates corresponding to sub-pixels of a same pixel have a same diffraction angle, diffraction angles of light beams emitted by different pixels in a same depth display unit after passing through the phase plate are different, so that reverse extension lines of the light beams emitted from the same depth display unit intersect at a depth position.

Optionally, the plurality of depth display units are divided into display groups arranged in an array, each display group is composed of at least two depth display units adjacent to each other; wherein depths of field of depth display units in a same display group are different.

Optionally, two adjacent depth display units have different depths of field.

Figure 6:
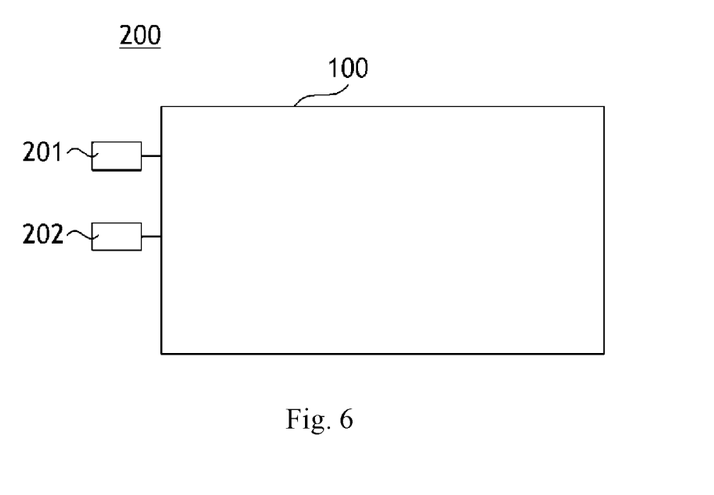
FIG. 6 is a structural schematic diagram of a holographic display device according to an embodiment of the present disclosure.

According to another aspect of the present disclosure, an embodiment of the present disclosure provides a holographic display device. As shown in FIG. 6, the holographic display device 200 includes the holographic display panel 100 as described in the above embodiments. The holographic display device 200 can further include a data interface 201 for providing holographic image data and a power interface 202. Other essential components of a holographic display device are also included, as can be understood by those of ordinary skill in the art, which are not described herein, and are not intended to limit the present disclosure.

The holographic display device can be any product or component with display function, such as mobile phone, tablet computer, TV, display, notebook computer, digital photo frame and navigator.

According to the holographic display panel and the holographic display device provided by the embodiments of the present disclosure, by using the blocking member, the problem of beam crosstalk caused by the Fraunhofer diffraction angle of small-size sub-pixels is well solved. Therefore, with the configuration of the embodiments of the present disclosure, clear sub-pixel edges can be obtained, color crosstalk and grayscale crosstalk can be eliminated, and an accurate depth of field of an image can also be provided, improving the visual effect of the holographic display.

Apparently, the person skilled in the art may make various alterations and variations to the disclosure without departing the spirit and scope of the disclosure. As such, provided that these modifications and variations of the disclosure pertain to the scope of the claims of the disclosure and their equivalents, the disclosure is intended to embrace these alterations and variations.

What is claimed is:

1. A holographic display panel comprising:
   a plurality of sub-pixels arranged in an array and a phase plate disposed on a light exit side of the plurality of sub-pixels;
   a blocking member disposed between the plurality of sub-pixels and the phase plate; an orthogonal projection of the blocking member on a plane where the plurality of sub-pixels is located being arranged between adjacent sub-pixels for blocking an edge portion of a light beam diffracted by the sub-pixel; and
   a plurality of depth display units; wherein each depth display unit comprises at least two adjacent pixels, and each pixel comprises a plurality of sub-pixels; each depth display unit further comprises a plurality of phase plates, each sub-pixel corresponds to a phase plate along a direction of light emitted from the sub-pixel, the phase plate is configured to control a diffraction angle of light emitted through the phase plate; wherein phase plates corresponding to sub-pixels of a same pixel have a same diffraction angle, diffraction angles of light beams emitted by different pixels in a same depth display unit after passing through the phase plate are different, so that reverse extension lines of the light beams emitted from the same depth display unit intersect at a depth position.

2. The holographic display panel according to claim 1, wherein a width a of the blocking member satisfies: $a=0.61\lambda d/w$, where $\lambda$ is a wavelength of the light beam, w is a width of the sub-pixel, and d is a distance between the blocking member and the sub-pixel.

3. The holographic display panel according to claim 1, further comprising a first substrate disposed on the light exit side of the plurality of sub-pixels; wherein the phase plate is disposed on a surface of the first substrate facing away from the plurality of sub-pixels, and the blocking member is disposed on a surface of the first substrate facing the plurality of sub-pixels.

4. The holographic display panel according to claim 1, further comprising a color film substrate disposed on the light exit side of the plurality of sub-pixels; wherein the blocking member is disposed on a surface of the color film substrate facing away from the plurality of sub-pixels.

5. The holographic display panel according to claim 1, wherein the phase plate comprises a plurality of sub-phase plates corresponding to the plurality of sub-pixels one-to-one.

6. The holographic display panel according to claim 5, wherein the phase plate is a diffraction grating.

7. The holographic display panel according to claim 1, wherein the plurality of depth display units are divided into display groups arranged in an array, each display group is composed of at least two depth display units adjacent to each other; wherein depths of field of depth display units in a same display group are different.

8. The holographic display panel according to claim 7, wherein two adjacent depth display units have different depths of field.

9. A holographic display device comprising the holographic display panel according to claim 1.

10. The holographic display device according to claim 9, wherein a width a of the blocking member satisfies: $a=0.61\lambda d/w$, where $\lambda$ is a wavelength of the light beam, w is a width of the sub-pixel, and d is a distance between the blocking member and the sub-pixel.

11. The holographic display device according to claim 10, wherein the phase plate comprises a plurality of sub-phase plates corresponding to the plurality of sub-pixels one-to-one.

12. The holographic display device according to claim 10, further comprising a first substrate disposed on the light exit side of the plurality of sub-pixels; wherein the phase plate is disposed on a surface of the first substrate facing away from the plurality of sub-pixels, and the blocking member is disposed on a surface of the first substrate facing the plurality of sub-pixels.

13. The holographic display device according to claim 10, further comprising a color film substrate disposed on the light exit side of the plurality of sub-pixels; wherein the blocking member is disposed on a surface of the color film substrate facing away from the plurality of sub-pixels.

14. The holographic display device according to claim 10, wherein the phase plate comprises a plurality of sub-phase plates corresponding to the plurality of sub-pixels one-to-one.

15. The holographic display device according to claim 14, wherein the phase plate is a diffraction grating.

16. The holographic display device according to claim 10, wherein the plurality of depth display units are divided into display groups arranged in an array, each display group is composed of at least two depth display units adjacent to each other; wherein depths of field of depth display units in a same display group are different.

17. The holographic display device according to claim 16, wherein two adjacent depth display units have different depths of field.

* * * * *